(12) United States Patent  (10) Patent No.: US 8,382,127 B2
Longenecker et al.  (45) Date of Patent: *Feb. 26, 2013

(54) RECLINABLE SEATBACK SUPPORT FOR STROLLER

(75) Inventors: Michael L. Longenecker, Lancaster, PA (US); Jeff G. Greger, Lititz, PA (US)

(73) Assignee: Artsana USA, Inc., Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/356,113

(22) Filed: Jan. 23, 2012

(65) Prior Publication Data

US 2012/0119472 A1    May 17, 2012

Related U.S. Application Data

(63) Continuation of application No. 12/059,591, filed on Mar. 31, 2008, now Pat. No. 8,100,429.

(51) Int. Cl.
*B62B 9/00* (2006.01)
*B62B 7/00* (2006.01)
*B62B 5/08* (2006.01)

(52) U.S. Cl. ....... 280/47.4; 280/643; 280/644; 280/648; 280/47.25; 280/47.38

(58) Field of Classification Search .............. 280/639, 280/642, 643, 644, 646, 647, 648, 650, 657, 280/658, 47.25, 47.34, 47.38, 47.4
See application file for complete search history.

(56) References Cited

U.S. PATENT DOCUMENTS

| | | | |
|---|---|---|---|
| 1,598,778 A | 5/1923 | Leake | |
| 1,709,527 A | 4/1929 | Ford | |
| 2,616,719 A | 11/1952 | Heideman | |
| 2,783,053 A | 2/1957 | Sheldrick et al. | |
| 3,112,042 A | 11/1963 | Leshner | |
| 3,168,330 A | 2/1965 | Smith et al. | |
| 3,227,484 A | 1/1966 | Merclean | |
| 3,390,893 A | 7/1968 | MacLaren | |
| 3,459,435 A * | 8/1969 | Garner | ................. 280/644 |
| 3,504,926 A | 4/1970 | Glaser | |

(Continued)

FOREIGN PATENT DOCUMENTS

BE    818905    12/1974
DE    34 07 241    2/1984

(Continued)

OTHER PUBLICATIONS

Evenflo® Easy Comfort Premier™ Stroller (1999).

(Continued)

*Primary Examiner* — John R Olszewski
(74) *Attorney, Agent, or Firm* — Volpe and Koenig, P.C.

(57) ABSTRACT

A stroller having an articulated frame with at least one front leg, at least one rear leg, and a reclinable seatback support. An adjustment member is fixed to the frame and defines a plurality of detents that correspond to selectable recline positions for the reclinable seatback support. A locking member is movably attached to the reclinable seatback support and removably engages one of the plurality of detents. An actuator handle is connected to the locking member and is movably mounted on a handle guide that is fixed to the seatback support. The actuator handle is slidable along the handle guide to a first position to move the locking member away from one of the plurality of detents and slidable along the handle guide to a second position to move the locking member into engagement with one of the plurality of detents.

18 Claims, 10 Drawing Sheets

U.S. PATENT DOCUMENTS

| | | |
|---|---|---|
| 3,556,546 A | 1/1971 | Garner |
| 3,561,787 A | 2/1971 | Toda et al. |
| 3,653,681 A | 4/1972 | Virtue |
| 3,799,567 A | 3/1974 | Toda |
| 3,989,295 A | 11/1976 | Sparkes |
| 4,007,947 A | 2/1977 | Perego |
| 4,023,825 A | 5/1977 | Kassai |
| 4,046,401 A | 9/1977 | Kassai |
| 4,111,454 A | 9/1978 | Kassai |
| 4,126,331 A | 11/1978 | Sloan et al. |
| 4,191,397 A | 3/1980 | Kassai |
| 4,232,897 A | 11/1980 | Maclaren et al. |
| 4,248,443 A | 2/1981 | Ohlson |
| 4,317,581 A | 3/1982 | Kassai |
| 4,322,093 A | 3/1982 | Otto |
| 4,335,900 A | 6/1982 | Fleischer |
| 4,362,315 A | 12/1982 | Kassai |
| 4,365,819 A | 12/1982 | Bart |
| 4,378,946 A | 4/1983 | Voytko et al. |
| 4,412,688 A | 11/1983 | Giordani |
| 4,415,180 A | 11/1983 | Payne, Jr. |
| 4,513,974 A | 4/1985 | Lin |
| 4,542,915 A | 9/1985 | Wheeler, III et al. |
| 4,564,212 A | 1/1986 | Orlandino et al. |
| 4,591,176 A | 5/1986 | Kassai |
| 4,602,395 A | 7/1986 | Kassai |
| 4,606,550 A | 8/1986 | Cone |
| 4,610,460 A | 9/1986 | Kassai |
| 4,632,420 A | 12/1986 | Miyagi |
| 4,632,421 A | 12/1986 | Shamie |
| 4,660,850 A | 4/1987 | Nakao et al. |
| 4,706,986 A | 11/1987 | Kassai |
| 4,733,882 A | 3/1988 | Kassai |
| 4,741,056 A | 5/1988 | Kassai |
| 4,741,551 A | 5/1988 | Perego |
| 4,763,911 A | 8/1988 | Gebhard et al. |
| 4,763,919 A | 8/1988 | Nakao et al. |
| 4,768,795 A | 9/1988 | Mar |
| 4,770,437 A | 9/1988 | Glaser |
| 4,805,928 A | 2/1989 | Nakao et al. |
| 4,807,928 A | 2/1989 | Cone |
| 4,817,982 A | 4/1989 | Kassai |
| 4,819,958 A | 4/1989 | Perego |
| 4,832,361 A | 5/1989 | Nakao et al. |
| 4,856,809 A | 8/1989 | Kohus et al. |
| 4,886,289 A | 12/1989 | Yee et al. |
| 4,892,327 A | 1/1990 | Cabagnero |
| 4,906,017 A | 3/1990 | Kassai |
| 4,907,818 A | 3/1990 | Chai |
| 4,924,725 A | 5/1990 | Takahashi et al. |
| D308,656 S | 6/1990 | Takahashi et al. |
| 4,930,697 A | 6/1990 | Takahashi et al. |
| D310,645 S | 9/1990 | Julien |
| 4,953,887 A | 9/1990 | Takahashi et al. |
| 4,968,092 A | 11/1990 | Giambrone |
| D317,280 S | 6/1991 | Takahashi et al. |
| 5,028,061 A | 7/1991 | Hawkes |
| D320,370 S | 10/1991 | Takahashi et al. |
| 5,056,805 A | 10/1991 | Wang |
| 5,074,575 A | 12/1991 | Bigo |
| 5,087,066 A | 2/1992 | Mong-Hsing |
| 5,110,150 A | 5/1992 | Chen |
| 5,143,398 A | 9/1992 | Teng |
| 5,181,735 A | 1/1993 | Onishi |
| 5,184,835 A | 2/1993 | Huang |
| 5,201,535 A | 4/1993 | Kato et al. |
| 5,205,577 A | 4/1993 | Liu |
| 5,205,579 A | 4/1993 | Kato et al. |
| D337,257 S | 7/1993 | Danieli |
| 5,238,292 A | 8/1993 | Golenz et al. |
| 5,244,228 A | 9/1993 | Chiu |
| 5,246,272 A | 9/1993 | Kato et al. |
| 5,257,799 A | 11/1993 | Cone et al. |
| D352,017 S | 11/1994 | Kaneko |
| 5,362,089 A | 11/1994 | Jyan-Tsai |
| 5,388,852 A | 2/1995 | Bigo et al. |
| 5,398,951 A | 3/1995 | Ryu |
| D357,439 S | 4/1995 | Haut et al. |
| D357,440 S | 4/1995 | Pietra |
| 5,417,449 A | 5/1995 | Shamie |
| 5,417,450 A | 5/1995 | Wang |
| 5,427,402 A | 6/1995 | Huang |
| 5,431,478 A | 7/1995 | Noonan |
| 5,437,493 A | 8/1995 | Weisleder |
| 5,441,163 A | 8/1995 | Carrasco |
| 5,454,584 A | 10/1995 | Haut et al. |
| 5,460,395 A | 10/1995 | Chen |
| 5,460,398 A | 10/1995 | Huang |
| 5,472,224 A | 12/1995 | Cabagnero |
| 5,478,102 A | 12/1995 | Huang |
| 5,489,138 A | 2/1996 | Mariol et al. |
| 5,511,259 A | 4/1996 | Tarara |
| 5,511,441 A | 4/1996 | Arai |
| 5,524,503 A | 6/1996 | Ishikura |
| 5,527,090 A | 6/1996 | Cone, II |
| 5,605,409 A | 2/1997 | Haut et al. |
| 5,622,377 A | 4/1997 | Shamie |
| 5,645,293 A | 7/1997 | Cheng |
| 5,649,737 A | 7/1997 | Behnke |
| 5,664,795 A | 9/1997 | Haung |
| 5,669,623 A | 9/1997 | Onishi |
| 5,669,624 A | 9/1997 | Eichhorn |
| 5,669,625 A | 9/1997 | Jane Cabagnero |
| 5,676,386 A | 10/1997 | Huang |
| 5,718,444 A | 2/1998 | Huang |
| 5,722,682 A | 3/1998 | Wang |
| 5,727,798 A | 3/1998 | Walters et al. |
| 5,741,021 A | 4/1998 | Saint et al. |
| 5,752,738 A | 5/1998 | Onishi et al. |
| 5,765,855 A | 6/1998 | Chiu |
| 5,765,856 A | 6/1998 | Kiser |
| 5,769,447 A | 6/1998 | Huang |
| 5,772,235 A | 6/1998 | Espenshade |
| 5,775,718 A | 7/1998 | Huang |
| 5,795,091 A | 8/1998 | Kakuda et al. |
| 5,810,432 A | 9/1998 | Haut et al. |
| 5,845,666 A | 12/1998 | Messner |
| 5,845,924 A | 12/1998 | Huang |
| 5,876,057 A | 3/1999 | Huang |
| 5,887,935 A | 3/1999 | Sack |
| D412,142 S | 7/1999 | Dickie |
| 5,921,571 A | 7/1999 | Bell |
| 5,934,757 A | 8/1999 | Smith |
| 5,938,229 A | 8/1999 | Chen et al. |
| 5,947,555 A | 9/1999 | Welsh, Jr. et al. |
| D415,075 S | 10/1999 | Lan |
| 5,979,928 A | 11/1999 | Kuo |
| 5,984,332 A | 11/1999 | Beaudoin et al. |
| 5,988,669 A | 11/1999 | Freese et al. |
| 5,988,670 A | 11/1999 | Song et al. |
| D419,113 S | 1/2000 | Everett |
| D421,940 S | 3/2000 | Gibson et al. |
| 6,068,284 A | 5/2000 | Kakuda |
| 6,070,890 A | 6/2000 | Haut et al. |
| D427,822 S | 7/2000 | Greger |
| 6,099,022 A | 8/2000 | Pring |
| 6,102,431 A | 8/2000 | Sutherland et al. |
| D431,212 S | 9/2000 | Haung |
| D431,213 S | 9/2000 | Yang |
| 6,116,624 A | 9/2000 | Hu |
| 6,129,373 A | 10/2000 | Cheng |
| 6,139,046 A | 10/2000 | Aalund et al. |
| 6,152,476 A | 11/2000 | Huang |
| 6,155,740 A | 12/2000 | Hartenstine |
| 6,189,914 B1 | 2/2001 | Worth et al. |
| 6,193,263 B1 | 2/2001 | Lin |
| 6,209,829 B1 | 4/2001 | Yu |
| 6,273,451 B1 | 8/2001 | Julien et al. |
| 6,286,844 B1 | 9/2001 | Cone, II et al. |
| 6,296,004 B1 | 10/2001 | Gordon |
| 6,299,194 B1 | 10/2001 | Chen |
| 6,302,613 B1 | 10/2001 | Lan |
| D452,192 S | 12/2001 | Hartenstine et al. |
| 6,339,862 B1 | 1/2002 | Cheng |
| 6,368,006 B1 | 4/2002 | Yang et al. |
| 6,398,233 B1 | 6/2002 | Liang et al. |
| 6,409,205 B1 | 6/2002 | Bapst et al. |

| | | | | | |
|---|---|---|---|---|---|
| 6,412,809 B1 | 7/2002 | Bigo et al. | DE | 198 33 115 | 7/1998 |
| 6,443,261 B1 | 9/2002 | Gibson et al. | DE | 299 00 901 | 1/1999 |
| 6,443,479 B2 | 9/2002 | Huang | DE | 200 01 964 | 4/2000 |
| 6,446,990 B1 | 9/2002 | Nania et al. | DE | 200 02 027 | 4/2000 |
| 6,467,739 B1 | 10/2002 | Jou | DE | 203 11 781 | 10/2003 |
| 6,478,327 B1 | 11/2002 | Hartenstine et al. | EP | 0 422 812 | 10/1990 |
| D470,803 S | 2/2003 | Hansen | EP | 0 639 489 | 8/1994 |
| D473,663 S | 4/2003 | Chou | EP | 0 719 693 | 11/1995 |
| 6,557,871 B2 | 5/2003 | Hsia | EP | 0 897 848 | 8/1998 |
| 6,557,885 B1 | 5/2003 | Kakuda | EP | 0 901 953 | 3/1999 |
| 6,572,134 B2 | 6/2003 | Barrett et al. | EP | 0 997 367 | 8/1999 |
| 6,581,957 B1 * | 6/2003 | Lan .................. 280/642 | EP | 0 994 004 | 4/2000 |
| D480,195 S | 9/2003 | Koerlin et al. | EP | 1 153 817 | 11/2001 |
| 6,666,473 B2 | 12/2003 | Hartenstine et al. | EP | 1 170 193 | 1/2002 |
| D494,511 S | 8/2004 | Chen | EP | 1 160 145 | 12/2004 |
| 6,851,700 B2 | 2/2005 | Yoshie et al. | EP | 1 666 331 | 6/2006 |
| 7,017,921 B2 | 3/2006 | Eros | EP | 1 591 339 | 12/2008 |
| 7,017,937 B2 | 3/2006 | Williams | ES | 2 016 525 | 8/1989 |
| 7,032,922 B1 | 4/2006 | Lan | ES | 2 069 458 | 9/1992 |
| D521,422 S | 5/2006 | Williams | FR | 2 089 832 | 4/1971 |
| 7,044,497 B2 | 5/2006 | Hartenstine et al. | FR | 2 244 348 | 9/1973 |
| 7,185,909 B2 | 3/2007 | Espenshade et al. | FR | 2 267 918 | 4/1974 |
| 7,188,858 B2 | 3/2007 | Hartenstine et al. | FR | 2 257 482 | 1/1975 |
| D545,074 S | 6/2007 | Loew et al. | FR | 2 323 563 | 9/1975 |
| 7,281,732 B2 | 10/2007 | Fox et al. | FR | 2 667 512 | 10/1990 |
| D558,648 S | 1/2008 | Feyler et al. | FR | 2 767 509 | 8/1998 |
| 7,338,122 B2 | 3/2008 | Hei et al. | GB | 0 690 115 | 5/1950 |
| D566,629 S | 4/2008 | Taylor | GB | 1 176 516 | 7/1967 |
| 7,445,229 B2 | 11/2008 | Dotsey et al. | GB | 1 394 564 | 12/1973 |
| 7,445,230 B2 | 11/2008 | Kassai et al. | GB | 1 510 312 | 9/1974 |
| D593,272 S | 5/2009 | Hailston | GB | 1 561 594 | 10/1976 |
| D604,151 S | 11/2009 | Kollman et al. | GB | 2 124 556 | 6/1982 |
| 7,621,431 B2 | 11/2009 | Williams | GB | 2 186 793 | 2/1987 |
| 7,686,322 B2 | 3/2010 | Longenecker et al. | GB | 2 197 784 | 6/1988 |
| D617,255 S | 6/2010 | Tezak et al. | GB | 2 225 557 | 12/1988 |
| D630,934 S | 1/2011 | Kollman et al. | GB | 2 244 029 | 3/1990 |
| 7,871,100 B2 | 1/2011 | Chen et al. | GB | 2 268 394 | 5/1992 |
| D636,300 S | 4/2011 | Greger et al. | GB | 2 251 830 | 7/1992 |
| 2003/0132611 A1 * | 7/2003 | Yoshie et al. ........ 280/642 | GB | 2 318 099 | 10/1996 |
| 2005/0012306 A1 * | 1/2005 | Lan ...................... 280/647 | GB | 2 324 510 | 3/1998 |
| 2005/0242549 A1 | 11/2005 | Longenecker et al. | GB | 2 342 897 | 10/1999 |
| 2006/0001226 A1 | 1/2006 | Refsum | IT | 1233953 | 1/1989 |
| 2006/0131840 A1 | 6/2006 | Donay | JP | 10-35506 | 2/1998 |
| 2006/0131841 A1 | 6/2006 | Huang | NL | 1009312 | 6/1998 |
| 2006/0152059 A1 | 7/2006 | Refsum | PT | 84257 | 2/1987 |
| 2006/0157945 A1 | 7/2006 | Refsum | SU | 1156949 | 4/1983 |
| 2006/0219374 A1 | 10/2006 | McKinney | WO | 88/02714 | 4/1988 |
| 2006/0261576 A1 | 11/2006 | Dotsey et al. | WO | 93/07039 | 4/1993 |
| 2009/0127827 A1 | 5/2009 | Pike et al. | WO | 99/50123 | 10/1999 |
| 2009/0127828 A1 | 5/2009 | Longenecker et al. | WO | 00/06437 | 2/2000 |
| 2010/0038886 A1 | 2/2010 | Greger et al. | WO | 01/28840 | 4/2001 |
| 2010/0171289 A1 | 7/2010 | Greger et al. | WO | 2009/065129 | 5/2009 |

FOREIGN PATENT DOCUMENTS

| | | |
|---|---|---|
| DE | 35 25 834 | 7/1985 |
| DE | 38 30 752 | 9/1988 |
| DE | 40 22 391 | 7/1990 |
| DE | 42 29 857 | 9/1992 |
| DE | 195 43 273 | 11/1995 |
| DE | 196 15 901 | 4/1996 |
| DE | 196 38 097 | 9/1996 |
| DE | 198 33 857 | 7/1997 |

OTHER PUBLICATIONS

Evenflo® Light & Easy™ Stroller (1999).
Evenflo® Easy Comfort Classic™ Travel System (1999).
Evenflo® Easy Comfort Plus™ Travel System (1999)
Evenflo® Easy Comfort Premier™ Travel System (1999)
JANE® Twin Two Stroller (printed May 5, 2010).

* cited by examiner

RECLINABLE SEATBACK SUPPORT FOR STROLLER

CROSS REFERENCE TO RELATED APPLICATION

This application is a continuation of U.S. patent application Ser. No. 12/059,591, filed Mar. 31, 2008, which is incorporated by reference as if fully set forth.

FIELD OF INVENTION

The present invention relates generally to child strollers. More particularly, the invention relates to a three-dimensional folding stroller having mounts for attachment of an infant carrier. Most particularly, the present invention relates to a stroller having movable mounts for an infant carrier that improves folding. The present invention also relates to a three-dimensional folding stroller having a one hand actuated reclining seatback support.

BACKGROUND

Three-dimensional folding strollers, also known as compound folding strollers, are well known in the art. The ability to fold in three-dimensions allows the stroller to achieve a more compact profile relative to known two-dimensional folding designs. Infant travel systems, which utilize a single infant carrier mountable between a car seat base and a stroller, are also well known in the art. An example of an infant travel system comprised of a stroller having mounts for attaching an infant carrier, such as an infant carseat carrier, can be found in U.S. Patent Publication Nos. 2005/0264062 and 2005/0242549. Strollers configured for use in travel systems utilize fixed mounts to secure the infant carrier to the stroller frame. The location of these fixed mounts on the stroller's frame is incompatible with a stroller having a three-dimensional folding design. Accordingly, there remains a need for a three-dimensional folding stroller useable in an infant travel system while retaining the ability to achieve the compact fold.

Foldable strollers having reclinable seatback supports are known in the art. However, there remains a need for a three-dimensional folding stroller having a reclinable seatback which can be operated with one hand while retaining an efficient, light-weight design.

SUMMARY

The present invention is directed to a three-dimensional folding stroller having mounts for an infant carrier. The mounts move between an operating position, when the infant carrier is engaged with the stroller, and a folding position, in which the mounts do not interfere with the stroller's ability to achieve a typical 3-D fold. The stroller's seat cover 42 is configured to ensure the mounts are properly positioned for the installation of the infant carrier 46, as well as to prevent the mounts from intruding into the infant seating area when the stroller is being used in a traditional fashion without the infant carrier 46.

Another aspect of the present invention is directed toward a foldable stroller having a reclinable seatback support which may be operated with one-hand. The reclining seatback support includes adjustment plates with a plurality of detents that define reclined positions for the seatback.

BRIEF DESCRIPTION OF THE DRAWINGS

The foregoing summary, as well as the following detailed description of the preferred embodiments of the invention, will be better understood when read in conjunction with the appended drawings. In the drawings.

DETAILED DESCRIPTION OF THE PREFERRED EMBODIMENT(S)

The invention will be described in detail with reference to FIGS. 1-10, wherein like numerals indicate like elements throughout. Throughout the description, "vertical" describes an orientation running from the bottom to the top of the stroller and "horizontal" describes an orientation running across the width of the stroller.

Figure 7:
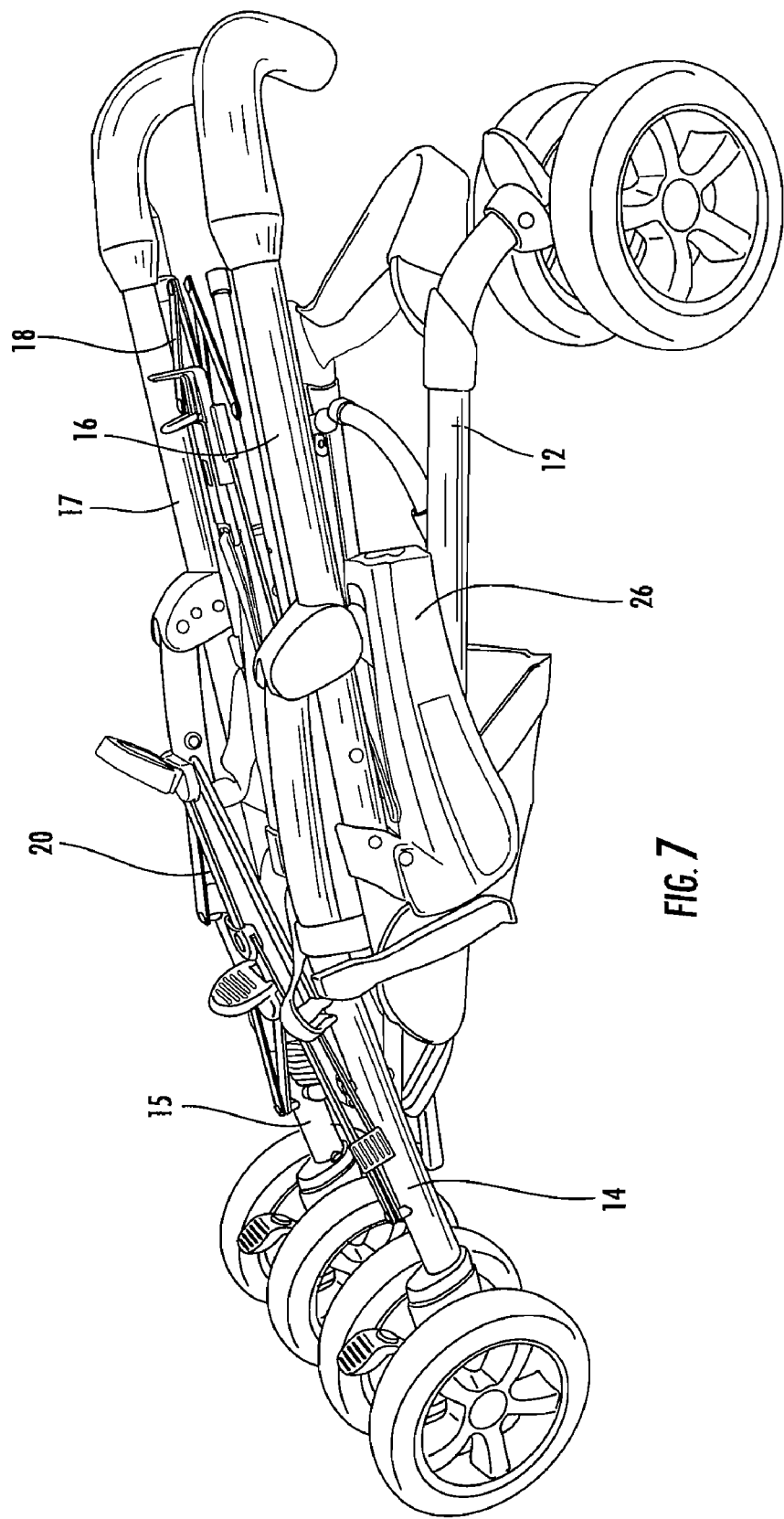
FIG. 7 illustrates the stroller frame of the present invention in the fully folded condition.
Figure 8:
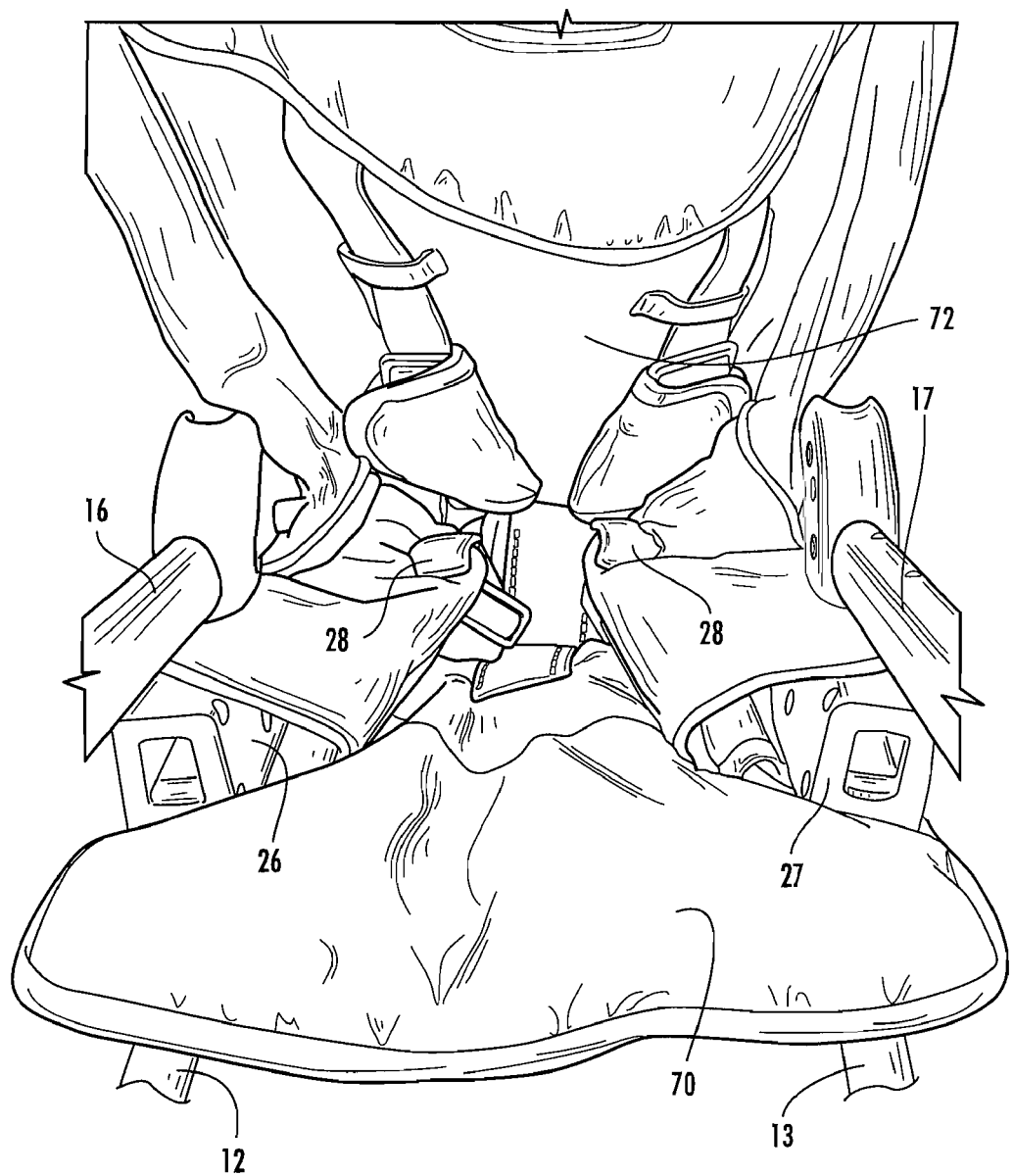
FIG. 8 is a view illustrating the position of the movable mounts and seat cover in the folded condition.

The three-dimensional folding stroller 10 of the present invention generally includes an articulated folding frame that converts between an open condition (FIGS. 1, 2, and 3), and a folded condition (FIGS. 7 and 8).

Figure 1:
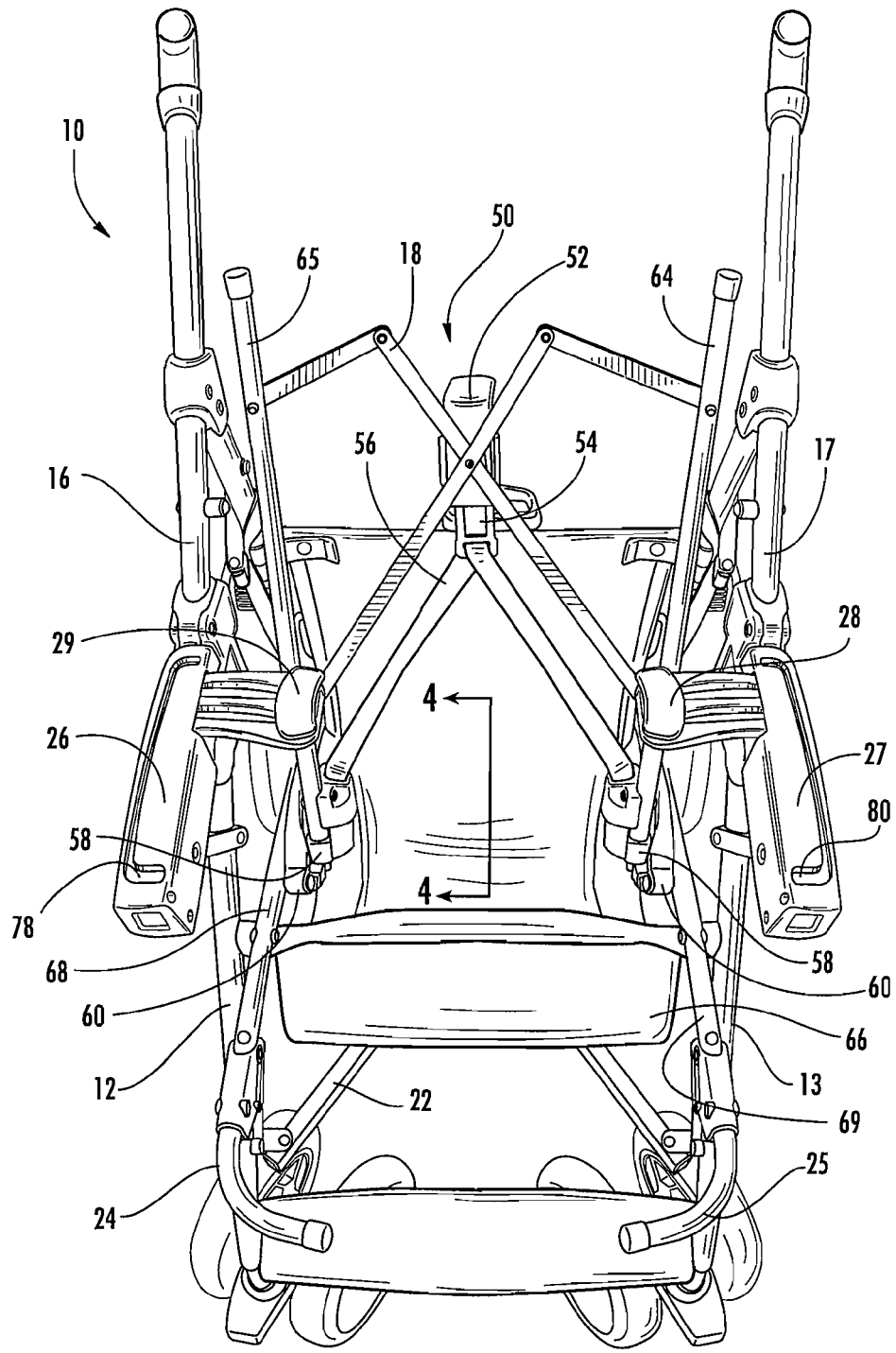
FIG. 1 illustrates the stroller frame of the present invention.

A preferred embodiment of the stroller with the infant carrier mounts shown in FIGS. 1-8 will now be described. Referring generally to FIG. 1, the stroller 10 comprises right and left front leg members 12, 13, right and left rear leg members 14, 15 (FIG. 6), right and left handle support rails 16, 17, right and left adjustable seat support members 24, 25, lower bracing 22, right and left lower frame members 68, 69, a reclining seatback support assembly 50, and right and left arms 26, 27.

Figure 2:
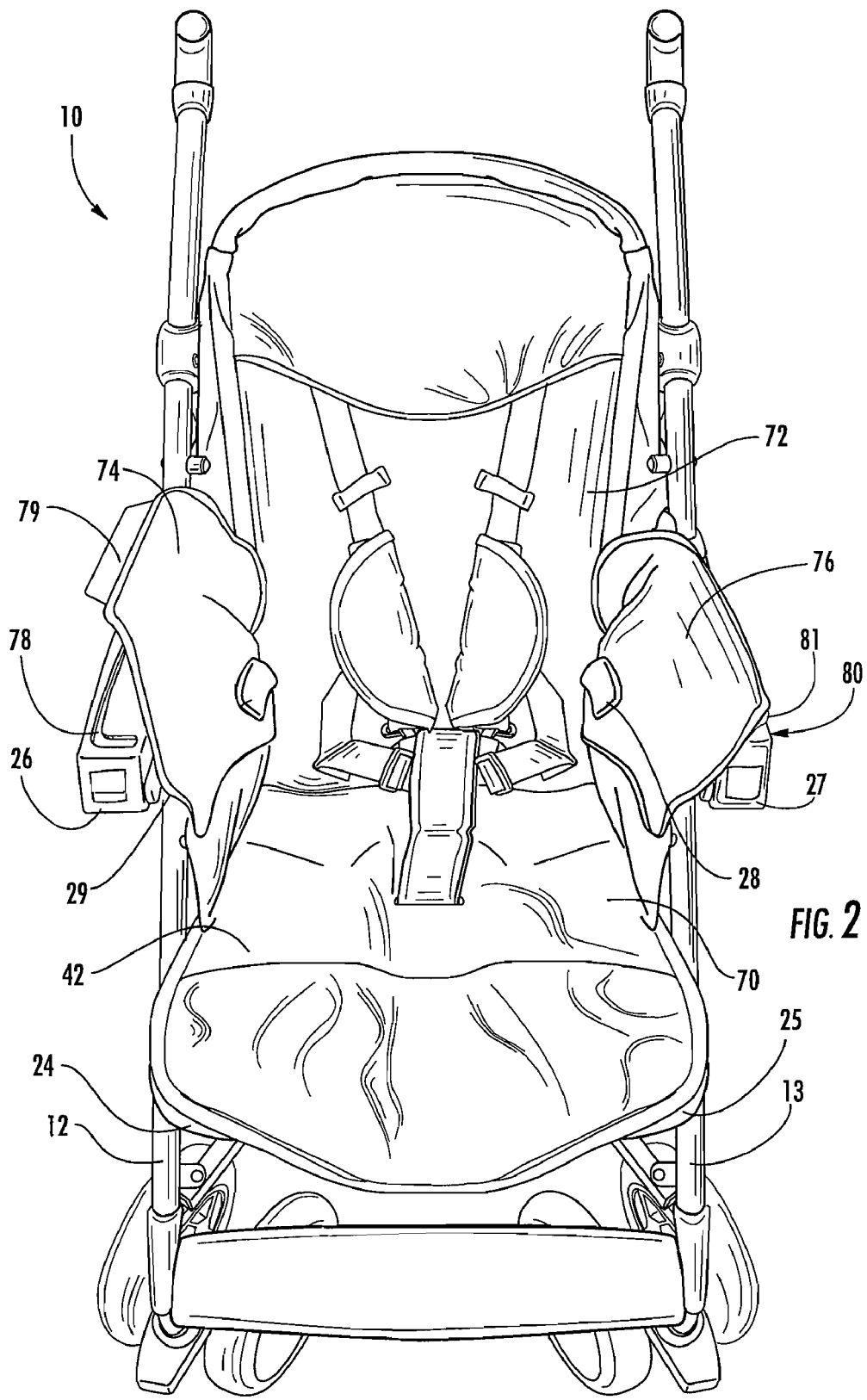
FIG. 2 shows the stroller frame of FIG. 1 with the seat cover installed.

Each of the arms 26, 27 has a respective infant carrier mount 28, 29 and a slot 78, 80 used to secure a seat cover, see FIG. 2. The infant carrier mounts 28, 29 capture and secure an infant carrier 46, see FIG. 3. With reference to FIGS. 1, 2 and 8, the infant carrier mounts 28, 29 are movable between an operating position (FIG. 2), and a folding position FIGS. 1 and 8.

Referring generally to FIG. 2, the foldable stroller is shown with a seat cover 42 installed over the frame 10. The cover 42 comprises a bottom portion 70, a back portion 72, and sides 74 and 76. The infant carrier mounts 28, 29 extend through a slot in the sides 74, 76 of the cover 42 to position them for contact with and to secure an infant carrier 46. As illustrated in FIG. 2, the cover 42 has stiffened ribbon portions 79, 81 that are inserted into the slots 78, 80 of the arms 26, 27 and secure the connection between the stroller arms 26, 27 and the cover 42. The remaining portions of the cover 42 are also secured to the stroller frame in a conventional fashion, such as by screws, buttons, clamps, or any other suitable fastening means. As a result of these connections, the cover 42 positions the seat mounts 28, 29 from a horizontal biased position shown in FIG. 1, toward a vertical position. This arrangement prevents the infant carrier mounts 28, 29 from intruding into the seating area when the infant carrier 46 is not in use, and orients the infant carrier mounts 28, 29 for attachment with the infant carrier 46.

Figure 3:
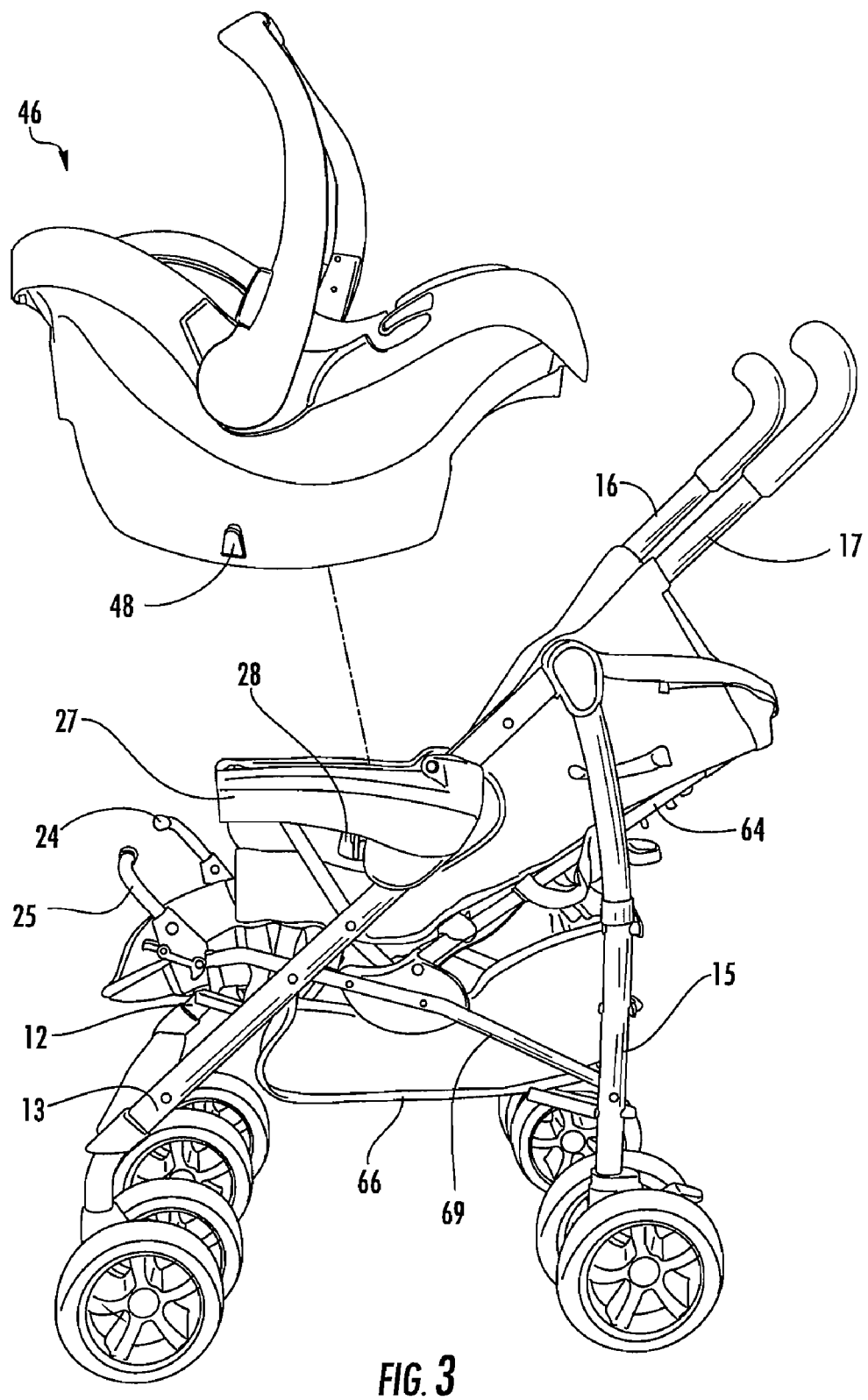
FIG. 3 is a side elevation illustrating the installation path for attaching an infant carrier to the stroller.

Referring generally to FIG. 3, an infant carrier 46, such as the infant car seat carrier described in U.S. Patent Publication No. 2005/0264062, includes some form of engaging projections 48. The projections 48 have a complimentary shape that engages with the infant carrier mounts 28, 29 when the seat 46 is inserted into the stroller in the manner illustrated. Once inserted, the infant carrier 46 fully displaces the infant carrier mounts 28, 29 into a substantially vertical position. A torsion spring 34 (FIG. 4) biases the infant carrier mounts 28, 29 toward the horizontal. In addition to providing improved contact with the locking projections 48 of the infant carrier 46, the bias provided by the spring 34 accommodates variations in the width of the infant carrier 46. This bias toward the horizontal is preferred as it improves the folding action.

Figure 4:
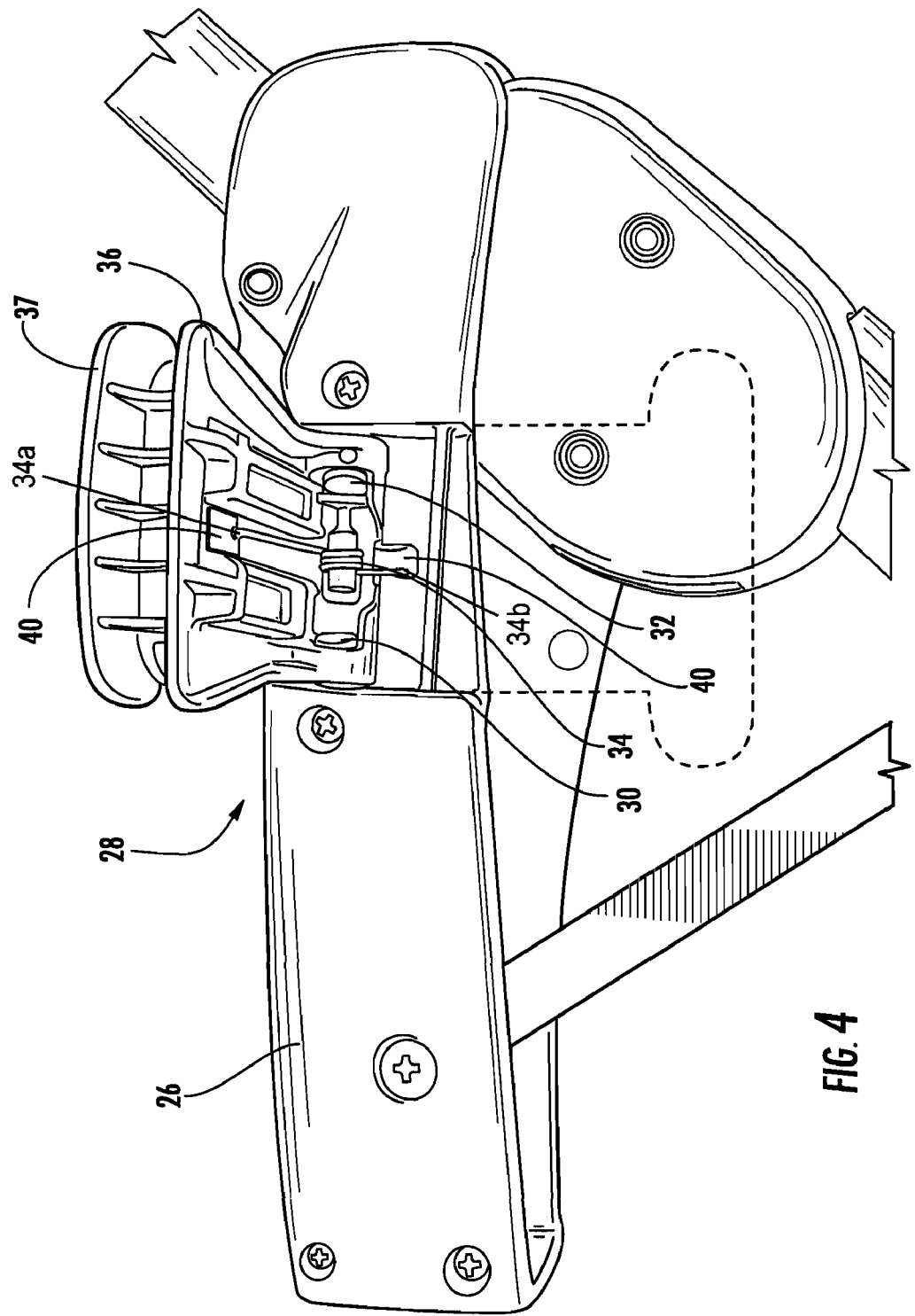
FIG. 4, a view taken alone line 4-4 in FIG. 1, shows the side view of the mount for the infant carrier.

Referring to FIG. 4, a side view of the arm 26 taken along line 4-4 in FIG. 1, the mount 28 is integrated into the stroller arm 26 and comprises a seat mount body 36 which is rotatably connected to two pins 30, 32. In the preferred embodiment, these pins 30, 32 are molded into the stroller arm 26, however, they may be secured to the arm 26 by any conventional means. The spring 34 is positioned between pins 30 and 32 with each of the free ends 34a, 34b positioned on a respective retaining surface 40. The seat mount body 36 has an engaging surface 37 of a complimentary shape to the projection 48 of the infant carrier 46 (FIG. 3). Installing the infant carrier 46 into the frame rotates the infant carrier mounts 28, 29 to a nearly vertical position, providing for the coupling between the engaging surfaces 37 of the infant carrier mounts 28, 29 and the locking projections 48 of the infant carrier 46. Once engaged, the springs 34 continually bias the infant carrier mounts 28, 29 against the infant carrier 46 to provide continuous contact with the projection 48 and secure the infant carrier 46 to the stroller.

In an alternate embodiment, the torsion spring 34 could be excluded from the assembly without departing from the scope of the invention. Further, it is envisioned that the infant carrier mounts 28, 29 could be attached to another suitable portion of the stroller frame so long as the mounts retain enough mobility to achieve the compact fold.

Figure 5:
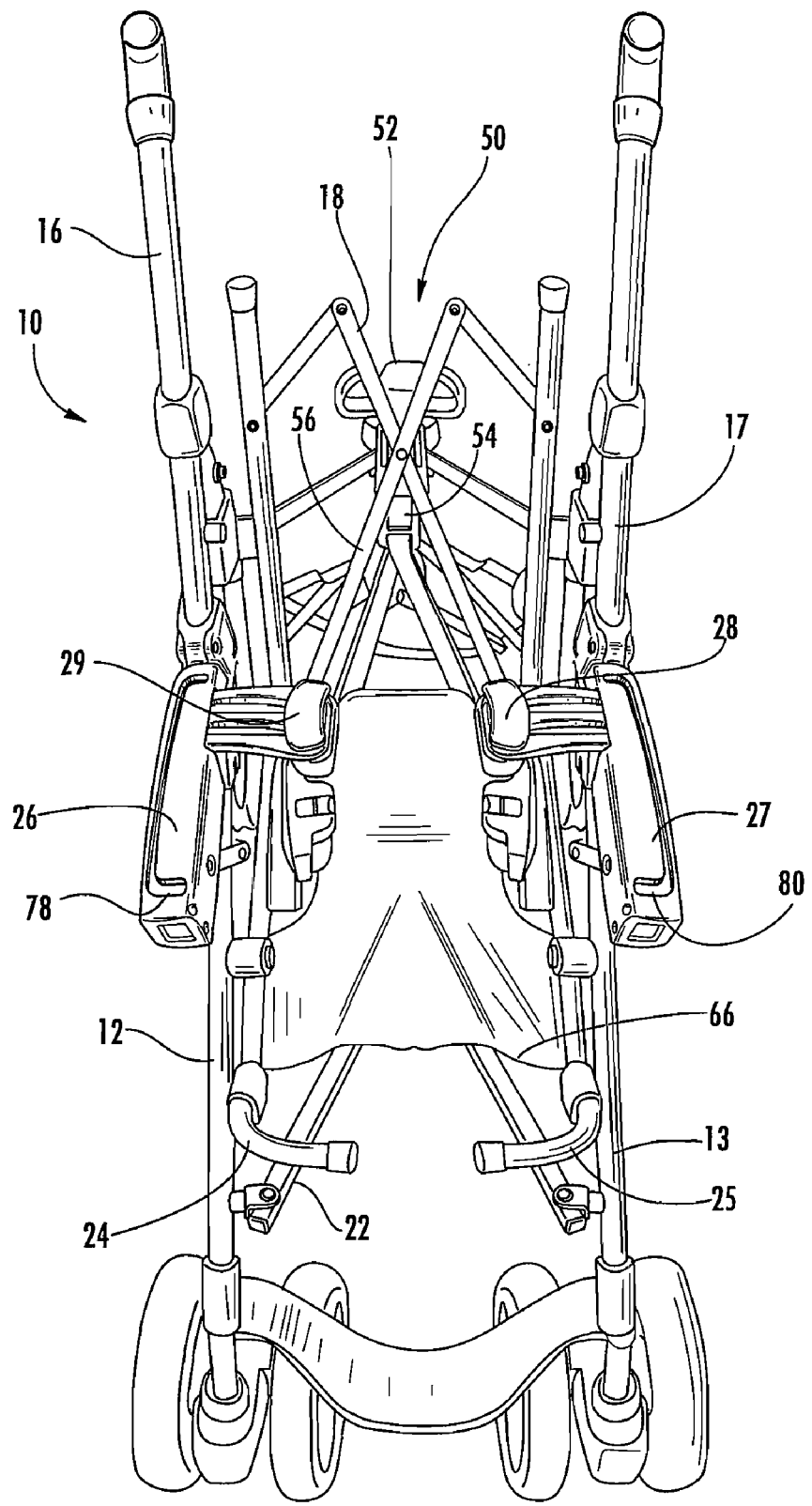
FIG. 5 illustrates the stroller frame of FIG. 1 in the partially folded condition.
Figure 6:
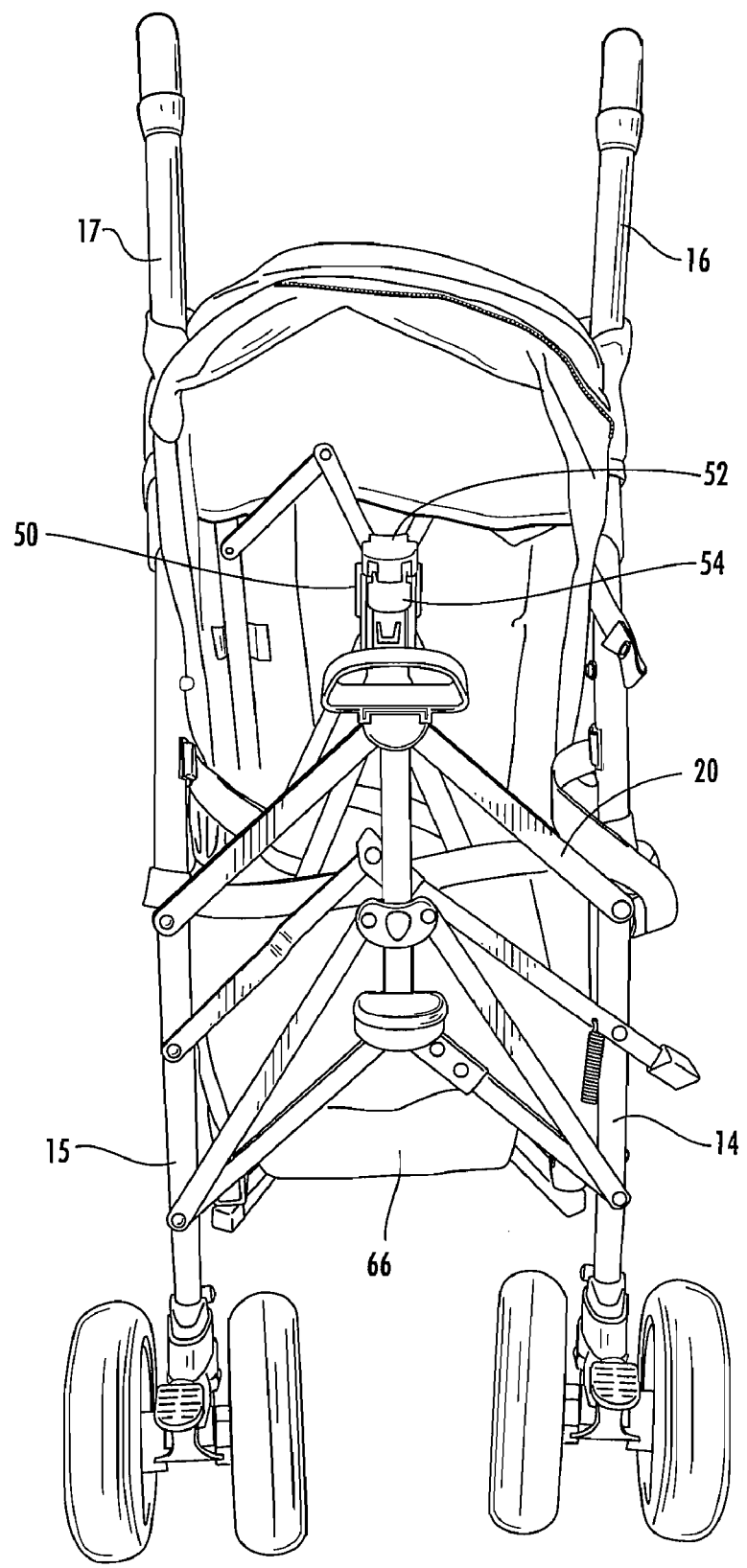
FIG. 6 is a rear view of the stroller frame of FIG. 5 with the seat cover installed.

Referring to FIGS. 5 and 6, the stroller of the present invention collapses in a fashion typical to three-dimensional folding strollers known in the art. Specifically, the lower bracing 22, rear bracing 20, and the reclining seatback frame 18 all collapse, resulting in the lower leg members 12, 13 and the handle support rails 16, 17 being pulled toward one another in the horizontal direction, reducing the overall width of the stroller 10. Finally, the leg members 12, 13 pivot toward an approximately parallel orientation with the handle support rails 16, 17. These two folding steps combine to create a compound fold which allows the stroller to be reduced to a profile much smaller than typical two-dimensional folding strollers.

FIG. 7 shows the stroller in its fully folded state. The stroller's right and left sides converge on one another as a result of the collapse of the rear bracing 20, the seatback frame 18, and the lower bracing 22 (not shown). The lower leg members 12, 13, pivot with respect to the handle supports 16, 17, bringing them into an approximately parallel orientation.

The need for the present invention is exemplified by examining the stroller in the folded configuration as shown in FIG. 8. When the stroller's frame is folded, the infant carrier mounts 28, 29 rotate into the folding position, or more nearly horizontal. This allows the infant carrier mounts 28, 29 to nest between the back seat portion 72 and the bottom seat portion 70. Had the infant carrier mounts 28, 29 been fixed in the operating position, the stroller frame would be inhibited from folding in the manner described above.

Another aspect of the present invention relating to a one-hand operated reclining seatback assembly 50 will now be described in detail. Generally referring to FIGS. 1, 9, and 10, the reclining seatback support assembly 50 features a seatback support frame 18, left and right seatback support frame rails 64, 65, a fixed handle guide 52, an operating handle 54, an activating strap 56, two projections 58, and two adjustment plates 60. The adjustment plates 60 are fixed to the lower frame members 68, 69 by fasteners 90 and feature a plurality of detents 62. The projections 58 feature engaging surfaces 59 and are biased by a spring, or other suitable means, toward engagement with one of the plurality of detents 62. The seatback support frame rails 64, 65 are pivotably mounted to the adjustment plates 60 by pins 92, allowing the seatback support assembly 50 to adjustably recline to a desired position.

Figure 9:
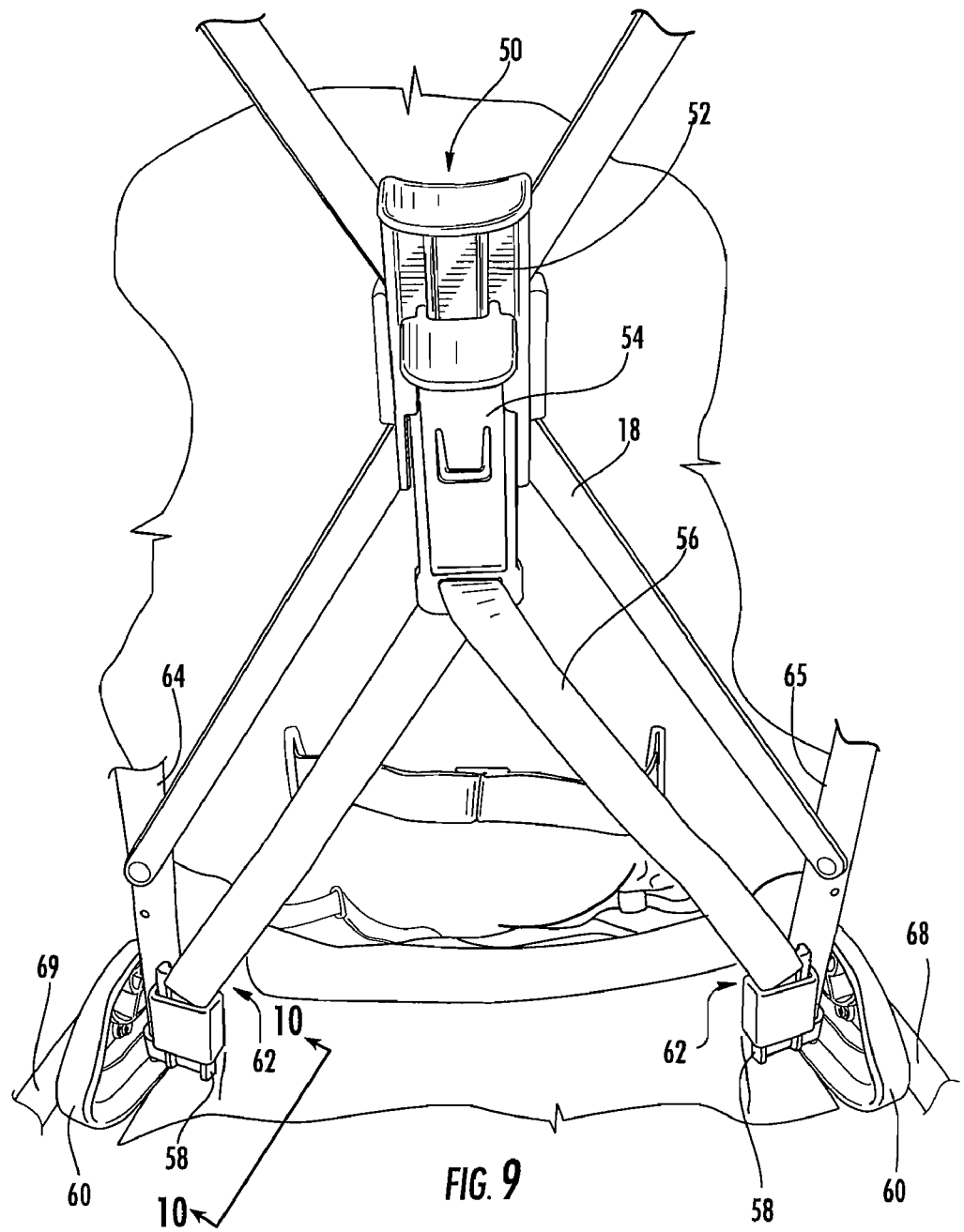
FIG. 9 is an elevation view of the reclining back support assembly of the present invention.
Figure 10:
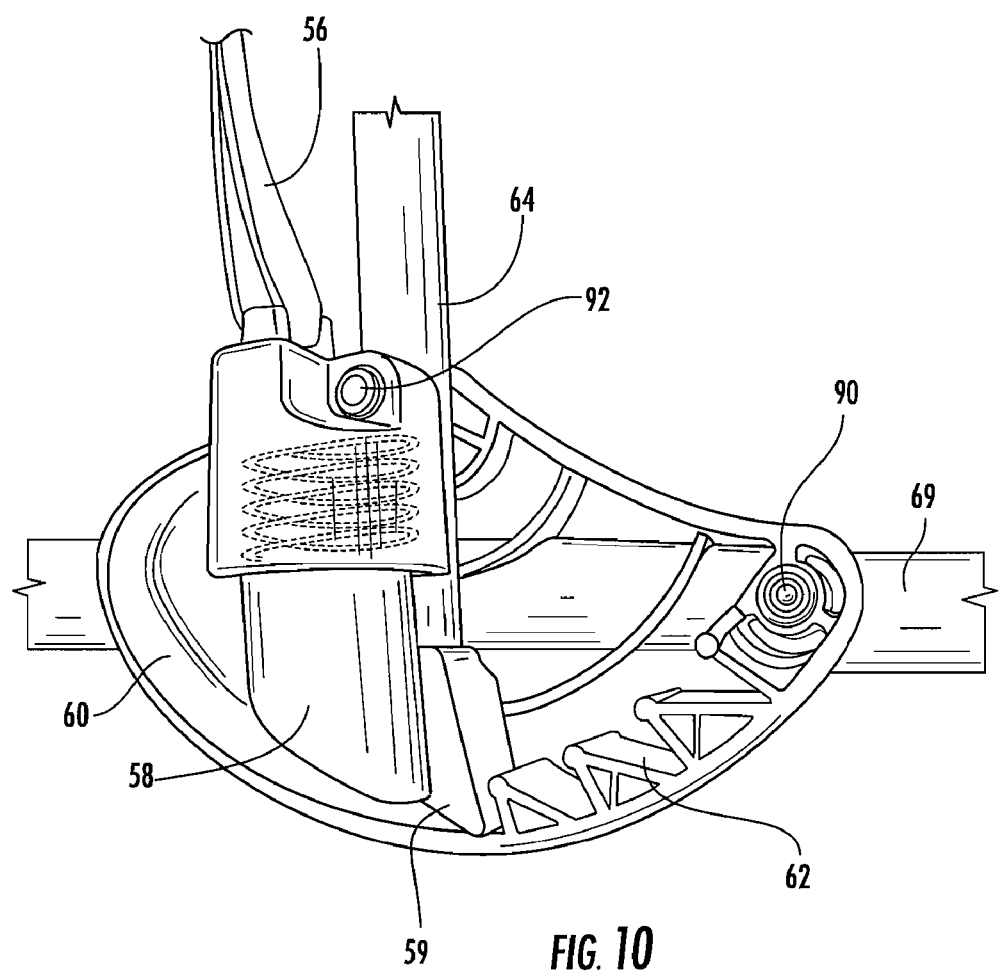
FIG. 10, a view taken along line 10-10 in FIG. 9, illustrates the adjustment mechanism for the one-hand reclining seatback support.

To recline the seatback, an operator can use one hand to apply an upward force on the operating handle 54 in a direction generally toward the top of the handle guide 52. The vertical movement of the handle 54 results in tensioning and upward movement of the activating strap 56. Referring to FIGS. 9 and 10, the activating strap 56 transfers the upward force to the projection 58, disengaging the engaging surface 59 from the detents 62 on the adjustment plate 60. Once disengaged, the back support frame rail 64 is free to rotate relative to the adjustment plate 60, which is fixed to the lower rail 69, allowing the entire seatback support assembly 50 to recline. The release of the operating handle 54 allows the projection 58 to reengage with the detents 62, setting the desired level of recline of the seatback support.

While various methods, configurations, and features of the present invention have been described above and shown in the drawings for the various embodiments of the present invention, those of ordinary skill in the art will appreciate from this disclosure that any combination of the above features can be used without departing from the scope of the present invention. Accordingly, it is recognized by those skilled in the art that changes may be made to the above described methods and embodiments of the invention without departing from the broad inventive concept thereof. It is understood, therefore, that this invention is not limited to the particular methods and embodiments disclosed, but is intended to cover all modifications which are within the spirit and scope of the invention as defined by the appended claims and/or shown in the attached drawings.

What is claimed is:

1. A stroller comprising:
    an articulated frame comprising at least one front leg, at least one rear leg, and a reclinable seatback support;
    at least one lower frame member having a first end attached to the at least one rear leg and a second end attached to the at least one front leg;
    an adjustment member fixed to the at least one lower frame member, the adjustment member defines a plurality of detents that correspond to selectable recline positions for the reclinable seatback support;
    a locking member movably attached to the reclinable seatback support that removably engages one of the plurality of detents; and
    an actuator connected to the locking member by a linkage, the linkage having a first end connected to the actuator and a second end connected to the locking member, the actuator movably mounted on a guide that is fixed to the seatback support, the actuator is slidable in a linear axis along the guide to a first position and slidable in the linear axis along the guide to a second position;
wherein movement of the actuator to the first position translationally displaces the first end of the linkage to move the locking member away from one of the plurality of detents, and movement of the actuator to the second position translationally displaces the first end of the linkage to move the locking member into engagement with one of the plurality of detents.

2. The stroller of claim 1, wherein the locking member is biased toward the plurality of detents.

3. The stroller of claim 2, wherein the locking member is spring biased.

4. The stroller of claim 1, wherein there are two adjustment members and two locking members.

5. The stroller of claim 1, wherein the locking member is movable in a vertical direction.

6. The stroller of claim 5, wherein the locking member is moved upwardly when it is moved away from one of the plurality of detents, and the locking member is moved downwardly when it is moved into engagement with one of the plurality of detents.

7. The stroller of claim 1, wherein the actuator has a tab extending perpendicular to the linear axis and the guide has a fixed anchor tab extending perpendicular to the linear axis.

8. A method of adjusting a reclinable seatback for a stroller comprising:
providing a stroller frame having at least one front leg, at least one rear leg, and a reclinable seatback support, the reclinable seat back support comprises right and left frame rails;
providing at least one lower frame member having a first end attached to the at least one rear leg and a second end attached to the at least one front leg;
providing an adjustment member fixed to the at least one lower frame member, at least one of the right and left frame rails pivotally attached to the adjustment member, the adjustment member defining a plurality of detents that correspond to selectable recline positions for the reclinable seatback support;
providing a locking member movably attached to at least one of the right and left frame rails, the locking member biased toward engagement with one of the plurality of detents; and
providing an actuator connected to the locking member and movably mounted on a guide that is fixed to the seatback support, the actuator movable in a linear path along the guide in a direction substantially parallel to a length of the left and right frame rails;
moving the actuator along the linear path to a first position to move the locking member in a direction away from one of the plurality of detents;
moving the reclinable seatback support to a selected recline position; and
moving the actuator along the linear path to a second position to move the locking member in a direction to engage a selected detent.

9. The method of claim 8, wherein the locking member is biased toward the plurality of detents.

10. The method of claim 9, wherein the locking member is spring biased.

11. The method of claim 8, wherein there are two adjustment members and two locking members.

12. The method of claim 8, wherein the locking member is movable in a direction parallel to the length of the right and left frame rails.

13. The method of claim 12, wherein the locking member is moved upwardly when it is moved away from one of the plurality of detents, and the locking member is moved downwardly when it is moved into engagement with one of the plurality of detents.

14. The method of claim 8, wherein the actuator has a tab extending perpendicular to the linear path and the guide has a fixed anchor tab extending perpendicular to the linear path.

15. A stroller comprising:
an articulated frame comprising at least one front leg, at least one rear leg, and a reclinable seatback, the reclinable seatback comprises right and left seatback frame rails and at least one back rest support connected to the right and left seatback frame rails;
at least one frame member having a first end attached to the at least one rear leg and a second end attached to the at least one front leg;
an adjustment member secured to the at least one frame member, at least one of the right and left seatback frame rails pivotally attached to the adjustment member, the adjustment member defines a plurality of detents that correspond to selectable recline positions for the reclinable seatback support;
a locking member movably attached to at least one of the right and left seatback frame rails that removably engages one of the plurality of detents; and
an actuator movably mounted on the at least one back rest support and connected to the locking member to adjust the position of the reclinable seatback.

16. The stroller of claim 15, wherein the actuator is movably mounted on a guide that is fixed to the at least one back rest support.

17. The stroller of claim 16, wherein the actuator is slidable along the guide to a first position to move the locking member away from one of the plurality of detents and slidable along the guide to a second position to move the locking member into engagement with one of the plurality of detents.

18. The stroller of claim 17, wherein the actuator is slidable along a linear axis.

* * * * *